United States Patent Office 3,201,319
Patented Aug. 17, 1965

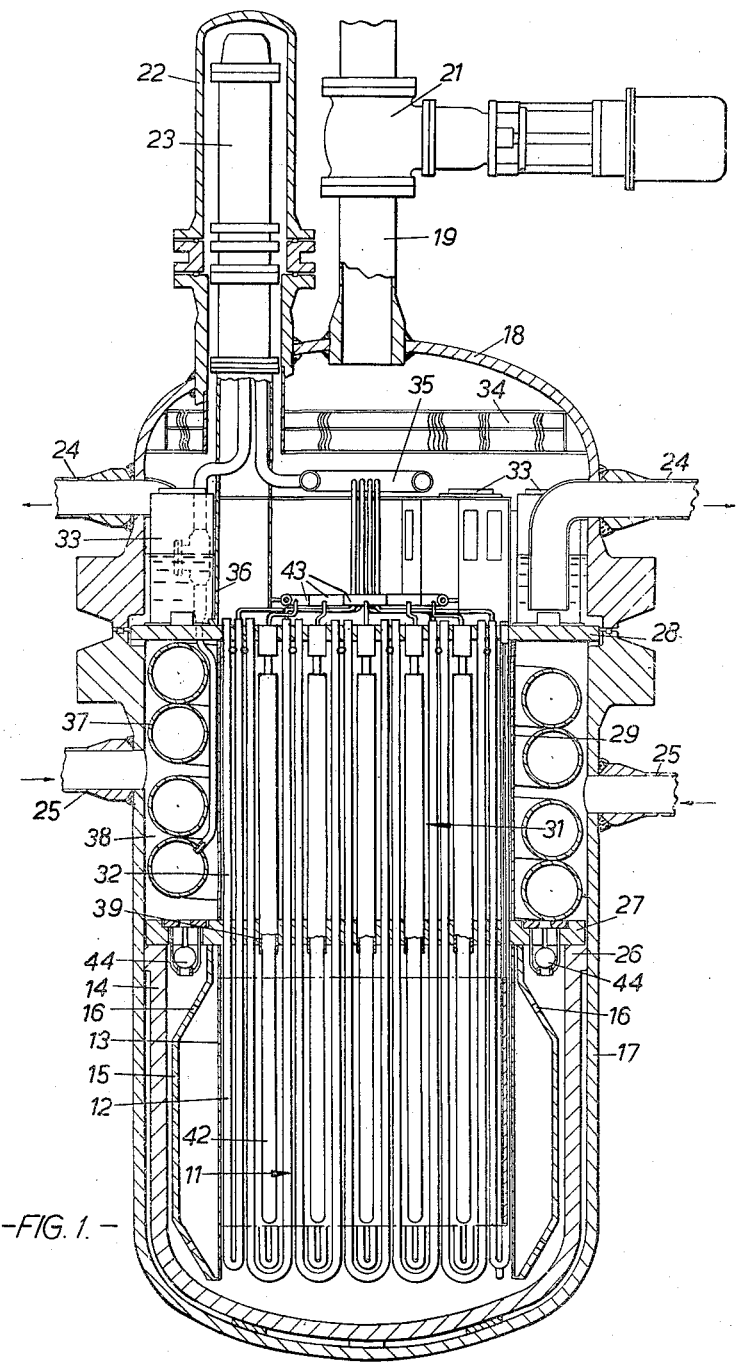
-FIG. 1.-

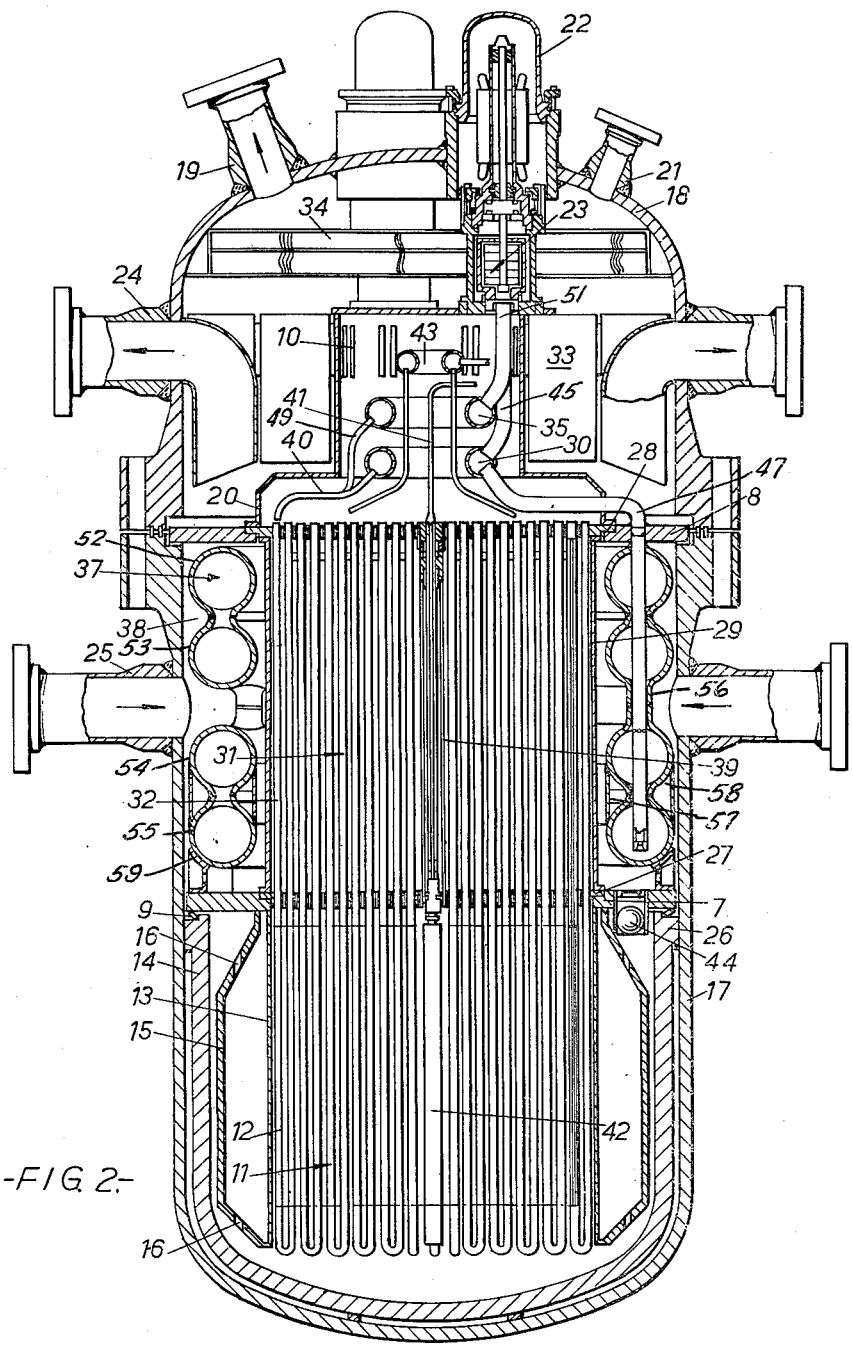
-FIG 2.-

3,201,319
NUCLEAR REACTOR WITH PRESSURIZER
Stanley Hackney, Fearnhead, near Warrington, and Ronald Peter Williams, Culcheth, Warrington, England, assignors to United Kingdom Atomic Energy Authority, London, England
Filed Nov. 19, 1962, Ser. No. 238,439
Claims priority, application Great Britain, July 5, 1962, 25,788/62
11 Claims. (Cl. 176—52)

The present invention relates to nuclear reactors and concerns more particularly the type of reactor which employs a fluid heat transfer medium as an intermediary between fuel elements constituting its core and a reactor coolant medium passing through the core. The fluid intermediary is advantageously a liquid moderator because if it is maintained under pressure to the point of at least almost suppressing boiling it affords a constant degree of neutron moderation and so enables an aqueous reactor coolant medium to be evaporated in the core to an extent as high as 80 to 90%.

According to the invention, there is provided a nuclear reactor having a vessel and means to contain within such vessel both a liquid heat transfer medium (hereinafter referred to as the primary coolant) and fuel elements constituting the reactor core such that the primary coolant is an intermediary between the fuel elements and a reactor coolant medium (hereinafter referred to as the secondary coolant) passing through the core, in which reactor the means containing the primary coolant separately from the secondary coolant is in communication with a pressure chamber which is arranged in the vessel to afford a sufficient vertical dimension for the primary coolant to form a free surface therein over the range of its operating temperature and which is adapted for gas to be admitted and trapped under pressure over such free surface so as to enable the primary coolant to be pressurized against bulk boiling. Preferably the circuit further includes a pumping means to induce a forced circulation in the primary coolant.

To avoid space immediately over the core being occupied by the pressure chamber, it is preferred that this chamber encompasses the core outline, as seen in plan, either within the depth of the core or at a higher level. For example, the pressure chamber may have an annular shape. However, it is a feature of the invention that the pressure chamber takes the form of a coil of ducting with its turns close together, such ducting preferably having a circular section so as to resemble a helical toroid. A great advantage to be gained from this form of pressure chamber is that if the axis of the coil is tilted out of the vertical the formation of gas locks prevents the liquid free surface from fully re-adjusting itself so that one can ensure that at least the bottom coil turn remains completely filled. For marine applications where the reactor must still be safe in the event of the vessel listing severely, the coil ducting can therefore afford a guarantee against interruption of the primary coolant circulation due to listing. Furthermore the wall thickness of the ducting is less than would be needed for an annular chamber of equivalent capacity.

A further feature of the invention is that the pressure chamber is in the form of several superposed endless ducts intercommunicating through pipes of smaller cross sectional area than the ducts. Preferably the ducts have a circular section and describe a circular path, the shape in this case then being toroidal.

By comparison with a coil, the alternative of several superposed ducts avoids any tendency with the coil for gas locks to progress towards the bottom turn of the coil under the influence of repeated tilting out of the vertical attitude, as during rolling and pitching on a ship.

Advantageously the pressure chamber is in a region of the vessel which remains at constant temperature during operation of the reactor; thus the chamber may be disposed in a region pervaded by entering secondary coolant, that is to say, secondary coolant at inlet temperature. The constant temperature of such region avoids variation of the temperature of the chamber contents through extraneous causes, and the thermal capacity of the secondary coolant acts to damp intraneously arising variation. Under these conditions the pressuriser constituted by the pressure chamber operates satisfactorily as a fixed volume unit.

The invention will be further described with reference, by way of example, to the particular embodiments as shown in the accompanying drawings, in which:

FIGURE 1 shows a vertical section through one reactor embodying the invention, and FIGURE 2 shows a vertical section through a second reactor embodying the invention.

The first reactor now to be described by way of example has a core 11 (FIGURE 1) in which fuel elements are housed in fuel tubes 12 through which pressurised light water is circulated as a primary coolant. The fuel tubes are clustered in a manner to be described hereinafter in a region defined by a baffle 13, this assembly being housed in a pot 14. A secondary coolant, also light water, is circulated downwards through the annular space between the pot and the baffle and upwardly through the core between the fuel tubes. A thermal shield 15, interposed between the baffle and the pot, has apertures 16 to permit downward flow of the secondary coolant. Neutron moderation in the reactor is effected by the primary and secondary coolants.

The reactor is housed in a reactor vessel 17 closed by a dome 18 from which projects a steam pipe 19 fitted with a main steam isolating valve 21 and three casings 22 (of which only one is shown in FIGURE 1) each housing a motor-driven pump 23 for circulating the primary coolant. Also projecting laterally of the dome are four outlets 24 for recirculating unevaporated secondary coolant, whilst projecting laterally of the vessel 17 are four inlets 25 for the recirculating secondary coolant. The pot sits within the lower half of the reactor vessel being located by a rim 26 surrounding the pot. An intermediate support plate 27 rests on the rim, whilst a top support plate 28 rests on a shoulder formed at the upper end of the vessel. These support plates traverse the reactor vessel. Between the support plates a skirt 29 defines a cylindrical heat transfer region 31 within which are clustered extension tubes 32, each extension tube being a continuation of a fuel tube. The upper end of the extension tubes and the lower ends of the fuel tubes are interconnected to form parallel paths of serpentine configuration for the primary coolant through series of tubes. The fuel tubes and the extension tubes are suspended from the top support plate and are steadied against vibration and deformation by the intermediate support plate.

Apertures in the support plates permit upward flow of the secondary coolant through the core and the heat transfer region into the dome. In its upward passage the secondary coolant is allowed to boil to form a mixture of steam and water which is separated in the dome by cyclone steam separators 33 carried by the top support plate which discharge water to the outlets 24 and steam to scrubber units 34 and thence to the steam outlet.

The primary coolant is collected from the paths through the fuel and extension tubes at an outlet ring header 35. Pumps 23 mounted on hollow stools 36 standing on the top support plate circulate the primary coolant from the outlet header 35 to a helical toroid pressuriser 37 and thence back to the fuel and extension tubes. The pressuriser serves to maintain the pressure of the primary coolant and is situated within the annular space 38 between the skirt and the reactor vessel.

Hollow open-ended shut off rods 39 of neutron absorbing material are housed within the heat transfer region during normal operation of the reactor and drop into the core over guide tubes 42 when it is desired to shut the reactor down. The shut off rods are hydraulically operated, there being a connection between each rod and an operating fluid header 43 which, as shown, is common to all the shut off rods.

The recirculated water of the secondary coolant, together with feed water as necessary, is returned to the reactor vessel by the inlets 25 which open into the annular space 38 above the intermediate support plate. Mounted in the intermediate support plate are about forty non-return valves 44 which the secondary coolant must pass to enter the core pot. These valves have an important temperature will automatically adjust the coolant pressure to ensure that no bulk boiling of this coolant can occur.

Having regard to the relatively small quantity of water in the primary coolant circuit, the four turns of the pressuriser coil represents a sufficient vertical dimension for the water free surface to be in the bottom tube when in a hot sub-critical condition (to be explained hereinafter) and approximately half way up the coil when at the temperature corresponding to the reactor at full power.

As part of the procedure for preparing the reactor for operation, a hot sub-critical condition will be achieved in which, for example, both coolants are at about 500° F. This is a convenient stage at which to build up the gas pressure in the pressuriser. By way of illustration, let it be supposed that the operating pressure is to be 2,100 lbs. per sq. inch gauge for a full power operating temperature of about 600° F. A gas pressure of about 1,300 lbs. per sq. inch gauge is trapped in the pressuriser at this stage so that the temperature increment to full power will bring about the requisite operating pressure. The gas employed should be compatible with its environment, such as nitrogen, helium or hydrogen.

Operating the pressuriser as a fixed-volume unit has the added advantage that in the event of the secondary coolant becoming depressurised (its normal pressure being, say, 650 lbs. per sq. inch gauge) the increased boiling of the secondary coolant which then takes place shuts the reactor down and consequently lowers the temperature of the primary coolant and so brings about an automatic reduction of the primary coolant pressure. In this way the fuel and extension tubes are relieved of the full force of the primary circuit operating pressure the drawing) to the outlet ring header 35 which is connected by a pipe 51 to the suction side of the pump.

The pressurizer 37 is composed of four toroids 52 to 55 of the same size which are superposed in a right cylindrical arrangement with a slightly larger spacing between the toroids 53 and 54 where the inlets 25 for the recirculating secondary coolant open into the reactor vessel, the spacing being determined by pipes such as 56 which interconnect each pair of mutually adjacent toroids at several points distributed around the toroid perimeter. These pipes 55 are of smaller internal diameter than the toroids and where seen at the right hand side of the drawing are aligned one above the other so that the inlet pipe 47 entering the top toroid extends through them to the bottom toroid.

The toroids of the pressuriser are braced by rings 57 and 58 which are secured concentrically over the toroids 54 and 55. Support is by means of pedestals such as 59 presenting suitably curved faces on which to rest the bottom toroid 55.

Through valves and piping (not shown) the top toroid 52 is connected to a blanket gas compressor situated externally of the reactor vessel 17. Gas made available at a predetermined pressure by the compressor is trapped in the pressuriser so that when the primary coolant is at a temperature corresponding to the reactor at full power the pressure built up in the trapped gas is such as to ensure that no bulk boiling of the primary coolant can occur. Preferably, the pressure is pre-arranged to permit a slight degree of boiling sufficient to form small steam bubbles which have the effect of creating turbulence in the primary coolant to assist heat transfer.

What we claim is:

1. A nuclear reactor wherein a secondary coolant is heated by fuel elements, said reactor comprising a vessel, means disposed in the vessel to contain in isolation from the secondary coolant both the fuel elements and a liquid primary coolant, a pressure chamber disposed in the vessel in communication with said means and affording a sufficient vertical dimension for the primary coolant to form a free surface therein over the range of its operating temperature, and means enabling gas to be admitted to the pressure chamber and trapped over such free surface for pressurisation of the primary coolant against bulk boiling.

2. A nuclear reactor wherein a secondary coolant is heated by fuel elements, said reactor comprising a vessel, tubing disposed in the vessel to contain in isolation from the secondary coolant both the fuel elements and a liquid primary coolant and to group the elements therein into a reactive core configuration of generally cylindrical shape, an annularly shaped pressure chamber in communication with the tubing and disposed in the vessel to encompass the core configuration and to afford a sufficient vertical dimension for the primary coolant to form a free surface therein over the range of its operating temperature, and means enabling gas to be admitted to the pressure chamber and trapped over such free surface for pressurisation of the primary coolant against bulk boiling.

3. A nuclear reactor wherein a secondary coolant is heated by fuel elements, said reactor comprising a vessel, tubing disposed in the vessel to contain in isolation from the secondary coolant both the fuel elements and a liquid primary coolant and to group the elements therein into a reactive core configuration of generally cylindrical shape, a baffle extending around the core configuration and bounding with the walls of the vessel an annular space, an inlet to conduct secondary coolant entering the vessel through the annular space before passage over the tubing, an annularly shaped pressure chamber in communication with the tubing and disposed in the annular space to afford a sufficient vertical dimension for the primary coolant to form a free surface therein over the range of its operating temperature, and means enabling gas to be admitted to the pressure chamber and trapped over such free surface for pressurisation of the primary coolant against bulk boiling.

4. A nuclear reactor comprising a vessel, fuel elements, means housing both the fuel elements and a liquid primary coolant and arranged in the vessel to group the elements into a reactive core configuration, a pressure chamber disposed in the vessel in communication with said means and affording a sufficient vertical dimension for the primary coolant to form a free surface therein over the range of its operating temperature, means enabling gas to be admitted to the pressure chamber and trapped over such free surface for pressurisation of the primary coolant against bulk boiling, an inlet for entry of a secondary coolant into the vessel, and means for guiding entering secondary coolant over the pressure chamber before passage over the fuel element containing means.

5. In a nuclear reactor wherein tubing disposed in a vessel contains both fuel elements and a liquid primary coolant in isolation from a secondary coolant, a pressuriser for the primary coolant comprising several superposed endless ducts, pipes establishing intercommunication between the ducts, these pipes being of a smaller internal cross sectional area than the ducts, means establishing communication of the ducts with the tubing, and means enabling gas to be admitted to the ducts and trapped therein.

6. The pressuriser according to claim 5 wherein each duct is of circular section and describes a circular path so as to be in the form of a toroid.

7. In a nuclear reactor wherein tubing disposed in a vessel contains both fuel elements and a liquid primary coolant in isolation from a secondary coolant, a pressuriser for the primary coolant comprising a coil of ducting with closely spaced turns, means establishing communication of the ducting with the tubing, and means enabling gas to be admitted to the ducting and trapped therein.

8. A nuclear reactor wherein a secondary coolant is heated by fuel elements, said reactor comprising a vessel, tubing disposed in the vessel to contain in isolation from the secondary coolant both the fuel elements and a liquid primary coolant and to group the elements therein into a reactive core configuration of generally cylindrical shape, a baffle extending around the core configuration and bounding with the walls of the vessel an annular space, an inlet to conduct secondary coolant entering the vessel through the annular space before passage over the tubing, and disposed in the annular space a pressuriser for the primary coolant comprising several superposed toroidal ducts, pipes establishing intercommunication between the ducts, these pipes being of a smaller internal cross sectional area than the ducts, means establishing communication of the ducts with the tubing, and means enabling gas to be admitted to the ducts and trapped therein.

9. A nuclear reactor wherein a secondary coolant is heated by fuel elements, said reactor comprising a vessel, tubing disposed in the vessel to contain in isolation from the secondary coolant both the fuel elements and a liquid primary coolant and to group the elements therein into a reactive core configuration of generally cylindrical shape, a baffle extending around the core configuration and bounding with the walls of the vessel an annular space, an inlet to conduct secondary coolant entering the vessel through the annular space before passage over the tubing, and disposed in the annular space a pressuriser for the primary coolant comprising a coil of ducting with closely spaced turns, means establishing communication of the ducting with the tubing, and means enabling gas to be admitted to the ducting and trapped therein.

10. In a boiling water nuclear reactor, the combination comprising a number of tubes clustered in upright parallel relationship, fuel elements contained in the tubes together with a liquid moderator, inlet and outlet headers disposed above the cluster of tubes, means interconnecting the tubes with one another and with the headers to establish flow paths of serpentine configuration progressing transversely of the cluster from the inlet header to the outlet header, a pump connected between the inlet and outlet headers, and a pressuriser for the liquid moderator comprising several superposed endless ducts encompassing the cluster of tubes, pipes establishing intercommunication between the ducts, these pipes being of smaller cross sectional area than the ducts, means establishing communication of the ducts with one of the headers, and means enabling gas to be admitted to the ducts and trapped therein.

11. The combination according to claim 10 which is modified in that the pressuriser comprises a coil of ducting with closely spaced turns encompassing the cluster of tubes.

References Cited by the Examiner

UNITED STATES PATENTS

| | | | |
|---|---|---|---|
| 2,958,637 | 11/60 | Voorhees | 204—193.2 X |
| 3,036,965 | 5/62 | Braun | 204—193.26 X |
| 3,041,264 | 6/62 | Ricard | 204—193.2 |

FOREIGN PATENTS 1,239,599  7/60  France.

CARL D. QUARFORTH, *Primary Examiner.*